United States Patent
Horiuchi et al.

(10) Patent No.: US 10,006,368 B2
(45) Date of Patent: Jun. 26, 2018

(54) GAS TURBINE BLADE

(71) Applicant: Mitsubishi Hitachi Power Systems, Ltd., Yokohama, Kanagawa (JP)

(72) Inventors: Yasuhiro Horiuchi, Yokohama (JP); Hisato Tagawa, Yokohama (JP); Tetsuro Morisaki, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 406 days.

(21) Appl. No.: 14/547,730

(22) Filed: Nov. 19, 2014

(65) Prior Publication Data
US 2015/0139814 A1   May 21, 2015

(30) Foreign Application Priority Data
Nov. 20, 2013 (JP) ................................. 2013-239575

(51) Int. Cl.
*F01D 5/18* (2006.01)
*F02C 7/18* (2006.01)

(52) U.S. Cl.
CPC ................. *F02C 7/18* (2013.01); *F01D 5/18* (2013.01); *F01D 5/187* (2013.01);
(Continued)

(58) Field of Classification Search
CPC ... F02C 7/18; F01D 5/18; F01D 5/187; F01D 5/188; F01D 5/189; F05D 2250/21;
(Continued)

(56) References Cited

U.S. PATENT DOCUMENTS 2,920,865 A  *  1/1960  Lombard .................. B64C 1/40
                                                         416/193 A
2,958,933 A  *  11/1960  Howald ................... B21H 7/16
                                                         29/889.72
(Continued)

FOREIGN PATENT DOCUMENTS

CA       2432685 A1  *  1/2004  ............. F01D 5/186
CA       2860292 A1  *  7/2013  ............. F01D 5/189
(Continued)

OTHER PUBLICATIONS

European Search Report dated Mar. 23, 2015 (Five (5) pages).
(Continued)

*Primary Examiner* — Kenneth Bomberg
*Assistant Examiner* — Brian Delrue
(74) *Attorney, Agent, or Firm* — Crowell & Moring LLP

(57) ABSTRACT

The invention provides a gas turbine blade that is capable of reducing the temperature difference between the pressure side and the suction side even if the trailing-edge cooling channel is narrow, thereby lessening thermal stress as well. A gas turbine blade 1 comprises: an internal trailing-edge cooling channel formed by a suction-side cooling target surface 6a and a pressure-side cooling target surface 6b that face each other; and multiple vortex-generator-shaped fins 10 disposed between the two cooling target surfaces 6a and 6b such that the fins 10 connect the two cooling target surfaces 6a and 6b. Each of the vortex-generator-shaped fins 10 includes an oblique surface 33 located on the downstream side of the flow direction of a cooling medium. A normal line 34 to the oblique surface 33 intersects with one of the two cooling target surfaces 6a and 6b.

2 Claims, 6 Drawing Sheets

(52) U.S. Cl.
CPC ...... *F05D 2250/21* (2013.01); *F05D 2250/38* (2013.01); *F05D 2260/221* (2013.01); *F05D 2260/2212* (2013.01); *F05D 2260/22141* (2013.01)

(58) Field of Classification Search
CPC ........... F05D 2250/38; F05D 2260/221; F05D 2260/2212; F05D 2260/22141
USPC ................................................ 416/97 R, 95
See application file for complete search history.

(56) References Cited

U.S. PATENT DOCUMENTS

| | | | | |
|---|---|---|---|---|
| 3,171,631 A * | 3/1965 | Aspinwall | ............... | F01D 5/187 416/233 |
| 3,494,709 A * | 2/1970 | Piearcey | .............. | B22D 27/045 148/404 |
| 3,736,071 A * | 5/1973 | Kydd | ........................ | F01D 5/08 415/115 |
| 3,816,022 A * | 6/1974 | Day | ........................ | F01D 5/185 416/191 |
| 4,064,300 A | 12/1977 | Bhangu | | |
| 4,212,587 A * | 7/1980 | Horner | .................... | F01D 5/185 416/96 R |
| 4,403,917 A * | 9/1983 | Laffitte | .................... | F01D 5/188 415/115 |
| 4,627,480 A * | 12/1986 | Lee | ........................... | B22C 9/04 164/122.1 |
| 4,786,233 A * | 11/1988 | Shizuya | ................ | F01D 5/187 416/90 R |
| 4,992,026 A * | 2/1991 | Ohtomo | .................. | F01D 5/187 415/115 |
| 5,215,431 A * | 6/1993 | Derrien | .................. | F01D 5/187 415/115 |
| 5,320,483 A * | 6/1994 | Cunha | .................... | F01D 5/187 415/114 |
| 5,361,828 A * | 11/1994 | Lee | ........................ | F01D 5/187 165/109.1 |
| 5,538,394 A * | 7/1996 | Inomata | ................ | F01D 5/187 415/115 |
| 5,624,231 A * | 4/1997 | Ohtomo | .................. | F01D 5/186 415/115 |
| 5,704,763 A * | 1/1998 | Lee | ........................ | F01D 5/188 415/115 |
| 5,975,850 A * | 11/1999 | Abuaf | .................... | F01D 5/187 415/115 |
| 6,056,508 A * | 5/2000 | Johnson | ................ | F01D 5/187 416/96 R |
| 6,068,445 A * | 5/2000 | Beeck | .................... | F01D 5/187 416/96 A |
| 6,142,734 A * | 11/2000 | Lee | ........................ | F01D 5/189 249/117 |
| 6,168,380 B1 * | 1/2001 | Weigand | ................ | F01D 5/187 415/115 |
| 6,206,638 B1 * | 3/2001 | Glynn | .................... | F01D 5/186 415/115 |
| 6,439,846 B1 * | 8/2002 | Anderson | ............... | F01D 5/187 416/96 A |
| 6,808,367 B1 * | 10/2004 | Liang | .................... | F01D 5/187 415/115 |
| 7,766,617 B1 * | 8/2010 | Liang | .................... | F01D 5/186 415/115 |
| 7,955,053 B1 * | 6/2011 | Liang | .................... | F01D 5/187 415/115 |
| 7,967,563 B1 * | 6/2011 | Liang | .................... | F01D 5/186 415/115 |
| 8,529,193 B2 * | 9/2013 | Venkataramanan | .... | F01D 5/186 415/115 |
| 9,482,101 B2 * | 11/2016 | Xu | .......................... | F01D 5/186 |
| 2002/0012589 A1 * | 1/2002 | Dailey | .................... | F01D 5/18 416/1 |
| 2002/0150468 A1 * | 10/2002 | Tiemann | ................ | B23P 15/02 415/115 |
| 2003/0035726 A1 * | 2/2003 | Tiemann | ................ | F01D 5/189 416/97 R |
| 2003/0049125 A1 * | 3/2003 | Bolms | .................... | F01D 5/147 416/97 R |
| 2003/0049127 A1 * | 3/2003 | Tiemann | ................ | F01D 5/189 416/97 R |
| 2003/0138322 A1 * | 7/2003 | Boury | .................... | F01D 5/186 416/97 R |
| 2005/0031450 A1 * | 2/2005 | Cunha | .................... | F01D 5/186 416/97 R |
| 2005/0031451 A1 * | 2/2005 | Cunha | .................... | F01D 5/187 416/97 R |
| 2005/0031452 A1 * | 2/2005 | Liang | .................... | F01D 5/186 416/97 R |
| 2005/0053458 A1 * | 3/2005 | Liang | ........................ | F01D 5/14 415/115 |
| 2005/0053459 A1 * | 3/2005 | Cunha | .................... | F01D 5/186 415/115 |
| 2005/0058545 A1 * | 3/2005 | Cardenas | ................ | F01D 5/081 416/97 R |
| 2006/0153678 A1 * | 7/2006 | Liang | .................... | F01D 5/187 416/97 R |
| 2006/0226290 A1 * | 10/2006 | Campbell | ............... | F01D 5/146 244/123.1 |
| 2008/0019840 A1 | 1/2008 | Cunha | | |
| 2008/0025842 A1 * | 1/2008 | Marini | .................... | F01D 5/147 416/193 A |
| 2008/0063524 A1 * | 3/2008 | Tibbott | ................ | F01D 5/187 416/95 |
| 2008/0226461 A1 * | 9/2008 | Beeck | .................... | F01D 5/187 416/90 R |
| 2008/0273987 A1 * | 11/2008 | Liang | .................... | F01D 5/186 416/97 R |
| 2008/0286115 A1 * | 11/2008 | Liang | .................... | F01D 5/186 416/97 R |
| 2009/0185903 A1 * | 7/2009 | Beeck | .................... | F01D 5/145 416/91 |
| 2010/0221121 A1 * | 9/2010 | Liang | .................... | F01D 5/187 416/97 R |
| 2010/0266410 A1 * | 10/2010 | Amaral | .................... | F01D 5/20 416/95 |
| 2010/0284822 A1 * | 11/2010 | Campbell | ............... | F01D 5/187 416/96 R |
| 2011/0044822 A1 * | 2/2011 | Hada | .................... | F01D 5/187 416/97 R |
| 2011/0058949 A1 * | 3/2011 | Marra | ................... | B21C 23/085 416/233 |
| 2011/0067378 A1 * | 3/2011 | Tibbott | ................ | F01D 25/32 60/39.091 |
| 2011/0110772 A1 * | 5/2011 | Arrell | .................... | B23P 15/04 415/177 |
| 2011/0146229 A1 * | 6/2011 | Bajusz | .................. | F28F 9/0075 60/226.1 |
| 2011/0164960 A1 * | 7/2011 | Maldonado | ............. | F01D 5/186 415/115 |
| 2011/0176929 A1 * | 7/2011 | Ammann | ................ | F01D 5/186 416/97 R |
| 2011/0293422 A1 * | 12/2011 | Gupta | .................... | F01D 5/145 416/95 |
| 2011/0311369 A1 * | 12/2011 | Ramachandran | ........ | F01D 5/186 416/97 R |
| 2012/0014810 A1 * | 1/2012 | Antunes | ................ | F01D 5/14 416/97 R |
| 2012/0070302 A1 * | 3/2012 | Lee | ........................ | F01D 5/188 416/233 |
| 2012/0163984 A1 * | 6/2012 | Bunker | .................. | F01D 5/187 416/241 B |
| 2013/0052037 A1 * | 2/2013 | Abdel-Messeh | ........ | F01D 5/186 416/97 R |
| 2013/0115060 A1 * | 5/2013 | Walunj | .................... | F01D 5/186 415/176 |
| 2013/0115100 A1 * | 5/2013 | Walunj | .................... | F01D 5/186 416/97 R |

(56) References Cited

U.S. PATENT DOCUMENTS

| | | | |
|---|---|---|---|
| 2013/0115101 A1* | 5/2013 | Walunj | F01D 5/186 416/97 R |
| 2013/0115102 A1* | 5/2013 | Walunj | F01D 5/187 416/97 R |
| 2013/0115103 A1* | 5/2013 | Dutta | F01D 5/186 416/97 R |
| 2013/0136599 A1* | 5/2013 | Harding | F01D 25/12 416/95 |
| 2013/0209229 A1* | 8/2013 | Xu | F01D 5/186 415/115 |
| 2013/0243596 A1* | 9/2013 | Quach | F01D 5/187 416/92 |
| 2013/0251539 A1* | 9/2013 | Gautschi | F01D 5/187 416/97 R |
| 2013/0259703 A1* | 10/2013 | Zhang | F01D 5/186 416/97 R |
| 2013/0259704 A1* | 10/2013 | Zhang | F01D 5/081 416/97 R |
| 2013/0276460 A1* | 10/2013 | Propheter-Hinckley | B23P 15/02 60/806 |
| 2014/0044557 A1* | 2/2014 | Giglio | F01D 5/20 416/97 R |
| 2014/0064967 A1* | 3/2014 | Harding | F01D 5/186 416/95 |
| 2014/0093379 A1* | 4/2014 | Tibbott | F01D 5/189 416/224 |
| 2014/0105726 A1* | 4/2014 | Lee | F01D 5/188 415/115 |
| 2014/0119944 A1* | 5/2014 | Xu | F01D 5/186 416/97 R |
| 2014/0147287 A1* | 5/2014 | Xu | F01D 5/186 416/96 R |
| 2014/0286762 A1* | 9/2014 | Kerber | F01D 5/189 415/175 |
| 2014/0369852 A1* | 12/2014 | Zhang | F01D 5/187 416/97 A |
| 2015/0078916 A1* | 3/2015 | Bedrosyan | F01D 5/20 416/97 R |
| 2015/0104326 A1* | 4/2015 | Waldman | F01D 5/20 416/97 R |
| 2015/0198050 A1* | 7/2015 | Lee | F01D 5/188 415/115 |
| 2015/0267557 A1* | 9/2015 | Facchinetti | F01D 5/189 416/95 |
| 2015/0322802 A1* | 11/2015 | Weber | F01D 5/187 165/177 |
| 2016/0090844 A1* | 3/2016 | Auxier | F01D 5/187 416/95 |
| 2016/0146019 A1* | 5/2016 | Pizano | B22F 5/04 415/115 |
| 2016/0186660 A1* | 6/2016 | Bergholz | F02C 7/18 416/95 |
| 2016/0245093 A1* | 8/2016 | Deibel | F01D 9/041 |
| 2016/0245095 A1* | 8/2016 | Chouhan | F01D 5/20 |

FOREIGN PATENT DOCUMENTS

| | | | | |
|---|---|---|---|---|
| EP | 2573325 A1 | * | 3/2013 | F01D 5/189 |
| GB | 989217 A | * | 4/1965 | F01D 5/187 |
| JP | 52-13015 | | 2/1977 | |
| JP | 2006-242050 A | | 9/2006 | |
| JP | 2008-25569 A | | 2/2008 | |
| JP | 2009-41433 A | | 2/2009 | |

OTHER PUBLICATIONS

Japanese-language Office Action issued in counterpart Japanese Application No. 2013-239575 dated Jul. 18, 2017 (Three (3) pages).

* cited by examiner

GAS TURBINE BLADE

BACKGROUND OF THE INVENTION

1. Field of the Invention

The present invention relates to gas turbine blades having internal cooling structures.

2. Description of the Related Art

In recent years, the working gases of gas turbines are increasingly getting higher in temperature for better thermal efficiency. This requires at the same time improvements in the cooling performance of gas turbine blades. A gas turbine blade having internal cooling structures allows cooling air to flow through the interior of the blade, and the blade is cooled by heat exchange with the cooling air. At the trailing edge of the blade, however, a sufficient air channel height often cannot be secured. Thus, pin fin cooling is usually employed in the trailing-edge cooling channel, whereby pin fins are disposed between a suction-side cooling target surface and a pressure-side cooling target surface (i.e., between the inner wall surfaces of the blade). Such pin fins are also effective in increasing the strength of the blade against stress and vibration.

However, the suction-side and pressure-side blade surfaces of the gas turbine blade are subject to different thermal loads. As the temperature difference between the pressure and suction sides of the trailing edge increases with increases in combustion temperature, the trailing edge may be exposed to excessive thermal stresses accordingly. Thus, to make those temperatures equal, the cooling performance of either the pressure side or the suction side needs to be enhanced, but typical pin fins have a symmetrical shape. This means that the heat transfer rate of the suction-side and the heat transfer rate of the pressure-side are substantially the same.

JP-2009-041433-A discloses a method for enhancing the suction-side or pressure-side cooling performance of pin fin structures. In the method, triangular-pyramid-shaped vortex generators are additionally disposed only on the cooling target surface for which cooling performance needs to be enhanced. The vortex generators produce vertical vortices, thereby enhancing cooling of that cooling target surface.

SUMMARY OF THE INVENTION

Typically gas turbine blades are cooled by the air extracted from a compressor; thus, increases in the amount of the cooling air reduce the thermal efficiency of the gas turbine as a whole. Also, cooling structures with high cooling efficiency tend to be high in pressure loss. Since the flow of the cooling air into the gas turbine blades is caused by the pressure difference between the extraction pressure of the compressor and the pressure within the main flow passage of the turbine, excessively high pressure losses by such cooling structures make it impossible to supply a sufficient amount of cooling air to the gas turbine blades. Thus, in order to improve the thermal efficiency of the gas turbine while maintaining the soundness of the gas turbine blades, sufficient heat exchange needs to be performed with a small amount of cooling air.

Moreover, improving the aerodynamic performance of a gas turbine blade requires the thickness of its trailing edge to be smaller. For this reason, a typical trailing-edge cooling channel is relatively narrow (i.e., has a small height). When the vortex generators disclosed in the above patent literature are to be applied to such a narrow cooling channel, the vortex generators need to be reduced in size, which may fail to promote cooling sufficiently.

The present invention has been made in view of the above, and an object of the invention is to provide a gas turbine blade that is capable of reducing the temperature difference between the pressure side and the suction side even if the trailing-edge cooling channel is narrow, thereby lessening thermal stress as well.

To achieve the above object, the present invention provides a gas turbine blade comprising: an internal cooling channel formed by two mutually-facing cooling target surfaces, one of the cooling target surfaces being located on a suction side, the other being located on a pressure side; and a plurality of structural components disposed between the two cooling target surfaces such that the plurality of structural components connect the two cooling target surfaces, wherein each of the plurality of structural components includes an oblique surface located on the downstream side of a flow direction of a cooling medium and wherein a normal line to the oblique surface intersects with one of the two cooling target surfaces.

In accordance with the present invention, even if the trailing-edge cooling channel is narrow, the temperature difference between the pressure side and the suction side can be reduced, and thermal stress can be lessened as well.

DESCRIPTION OF THE PREFERRED EMBODIMENT

An embodiment of the present invention will now be described with reference to the accompanying drawings.

Figure 1:
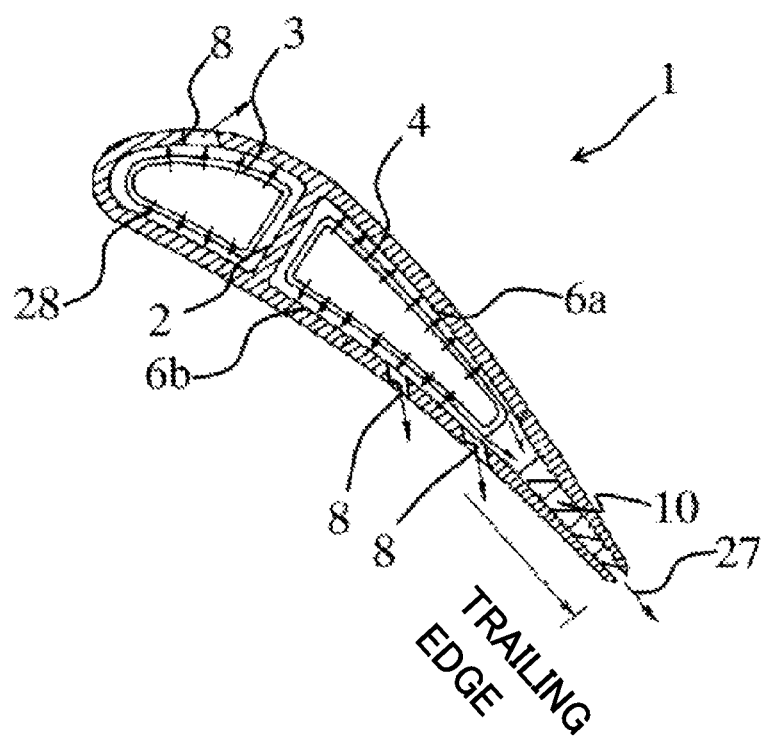
FIG. 1 is a circumferential cross section of a gas turbine blade according to an embodiment of the invention.
Figure 2:
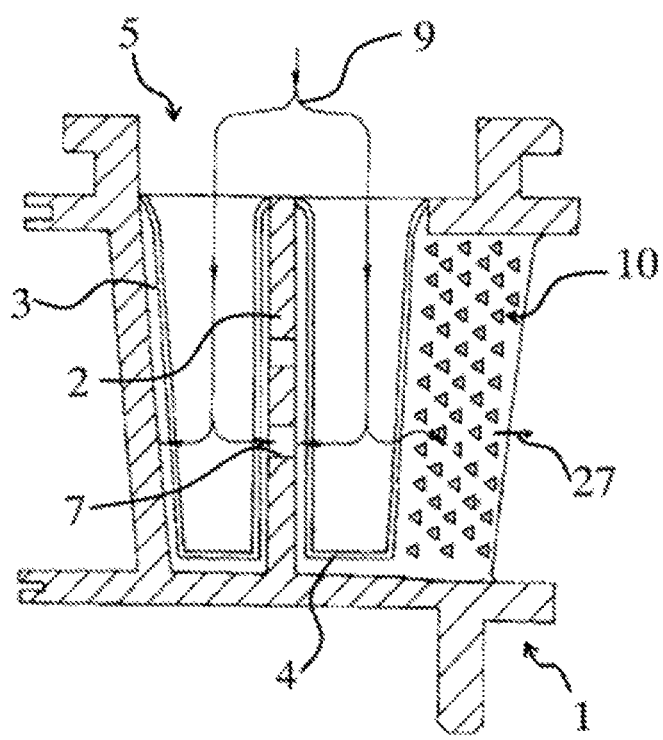
FIG. 2 is a radial cross section of the gas turbine blade.
Figure 3:
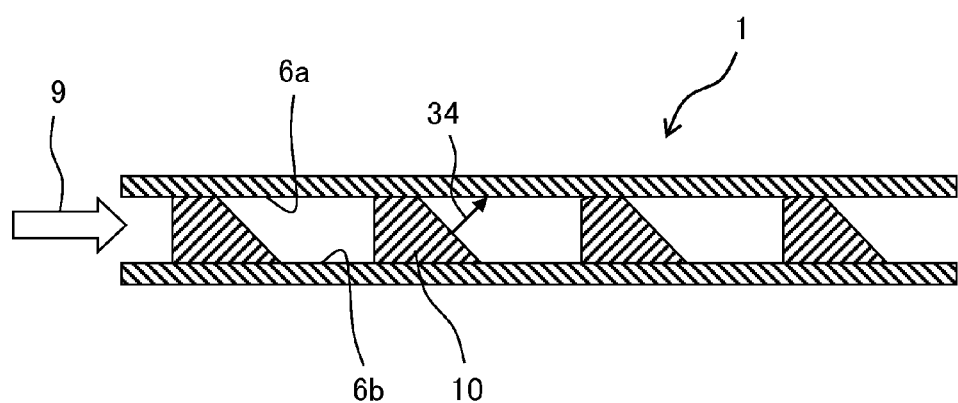
FIG. 3 is an enlarged radial cross section of the trailing-edge cooling channel of the gas turbine blade.
Figure 4:
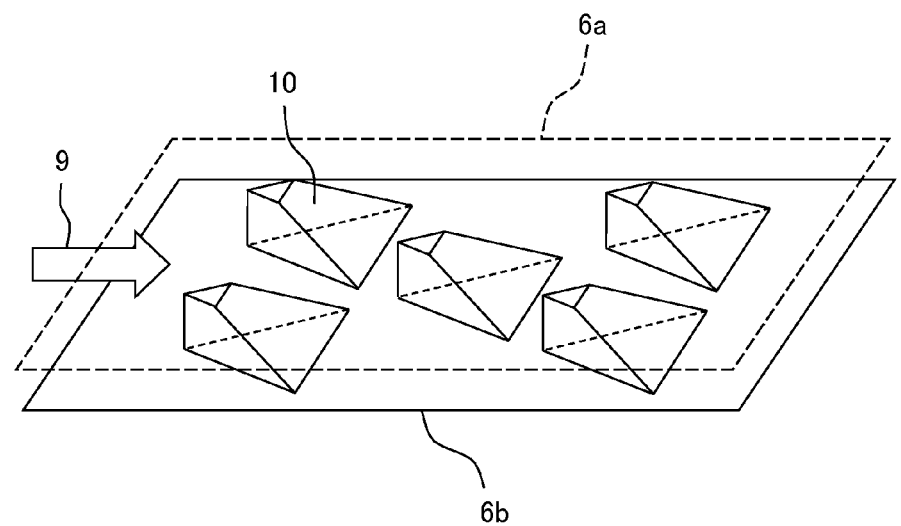
FIG. 4 is a perspective view of the trailing-edge cooling channel.

FIG. 1 is a circumferential cross section of a gas turbine blade according to an embodiment of the invention, and FIG. 2 is a radial cross section of the gas turbine blade. The circumferential cross section of FIG. 1 is obtained by cutting the blade with the side surface of a cylinder that shares the same axis as a gas turbine rotor while the radial cross section of FIG. 2 is obtained by cutting the blade with a plane that passes the rotational center of the rotor and extends in a radial direction of the rotor. FIG. 3 is an enlarged radial cross section of the trailing-edge cooling channel of the gas turbine blade, and FIG. 4 is a perspective view of the trailing-edge cooling channel.

In a gas turbine, a compressor compresses air, and a combustor combusts the air compressed by the compressor with fuel. The resultant combustion gas is directed to a turbine to obtain rotational energy. The present invention is applied to either or both of stator vanes and rotor blades of such a turbine, which are exposed to high-temperature combustion gas. The gas turbine blade 1 illustrated in FIGS. 1 and 2 is an example of a first-stage turbine vane (air-cooled blade) to which the invention is applied. In the present embodiment, the compressed air extracted from a compressor, which is generated for combustion purposes, is used as a cooling medium to be supplied to the gas turbine blade 1. However, it is instead possible to use the compressed air extracted from another compressor installed outside of the gas turbine or use a different coolant such as ammonia or the like.

As illustrated in FIGS. 1 and 2, the gas turbine blade 1 has a hollow structure, and the inner space of the blade 1 is separated by a diaphragm 2 into two chambers: a cavity on the leading edge side (front chamber) and a cavity on the trailing edge side (rear chamber). The diaphragm 2 has communicating holes 7 formed therethrough so that the front chamber and the rear chamber are connected via the communicating holes 7. A front-side core plug 3 and a rear-side core plug 4 are respectively inserted into the front chamber and the rear chamber for impingement cooling. These core plugs 3 and 4 have impingement holes 28 (see FIG. 1). As illustrated by the arrow 9 of FIG. 2, the cooling air (cooling medium) extracted from the compressor is directed through an air inflow path 5 located on the blade-root side (the upper side of FIG. 2) into the core plugs 3 and 4. The cooling air within the core plugs 3 and 4 flows out through the impingement holes 28 in the form of high-speed jets, colliding with and thus cooling mutually-facing inner walls of the gas turbine blade 1, that is, a pressure-side cooling target surface 6b and a suction-side cooling target surface 6a.

Part of the cooling air that has been used for the impingement cooling is ejected from film holes 8 located on the leading edge side and the pressure side (see FIG. 1) to a gas path as film cooling air. The rest is directed through a trailing-edge cooling channel (narrow air passage) located on the trailing edge side of the rear chamber and eventually ejected from the distal end of the trailing edge of the blade 1 to the gas path. Note that in light of aerodynamic performance, the blade thickness of the gas turbine blade 1 needs to be smaller as it gets closer to the trailing edge. Thus, the height of the trailing-edge cooling channel becomes smaller as it gets closer to the distal end of the trailing edge.

A main feature of the present embodiment is that vortex-generator-shaped fins 10 (structural components) are disposed in the trailing-edge cooling channel such that they connect the pressure-side cooling target surface 6b and the suction-side cooling target surface 6a. As illustrated by the arrow 9 of FIG. 2, cooling air flows through the trailing-edge cooling channel to cool the vortex-generator-shaped fins 10 and then flows out, as illustrated by the arrow 27 of FIGS. 1 and 2, from the distal end of the trailing edge. The vortex-generator-shaped fins 10 are arranged in rows in a direction perpendicular to the flow direction of the cooling air in the trailing-edge cooling channel. The flow direction in the trailing-edge cooling channel is equivalent to a chordwise direction (i.e., from left to right in FIG. 2), and the direction perpendicular to it is equivalent to a spanwise direction (i.e., a turbine radial direction). Thus, as illustrated in FIG. 2, the vortex-generator-shaped fins 10 are arranged in rows in the spanwise direction, and these spanwise rows are arranged in the chordwise direction. Also, each of the spanwise rows is displaced by half a pitch in the spanwise direction from the spanwise rows arranged adjacent to it. Accordingly, when viewed from a circumferential direction, the vortex-generator-shaped fins 10 as a whole are arranged in zigzags (see FIGS. 2 and 4).

It should be noted that while the vortex-generator-shaped fins 10 of the present embodiment are provided only for cooling the trailing edge, their installation places are not limited to the trailing edge. For instance, they can instead be disposed in a serpentine cooling channel, which is often used for internal cooling of a rotor blade. Also, while the vortex-generator-shaped fins 10 of the present embodiment are shown equal in size, this is not meant to limit their shape. Likewise, the zigzag arrangement of the vortex-generator-shaped fins 10 is also meant to be an example.

Figure 5A:
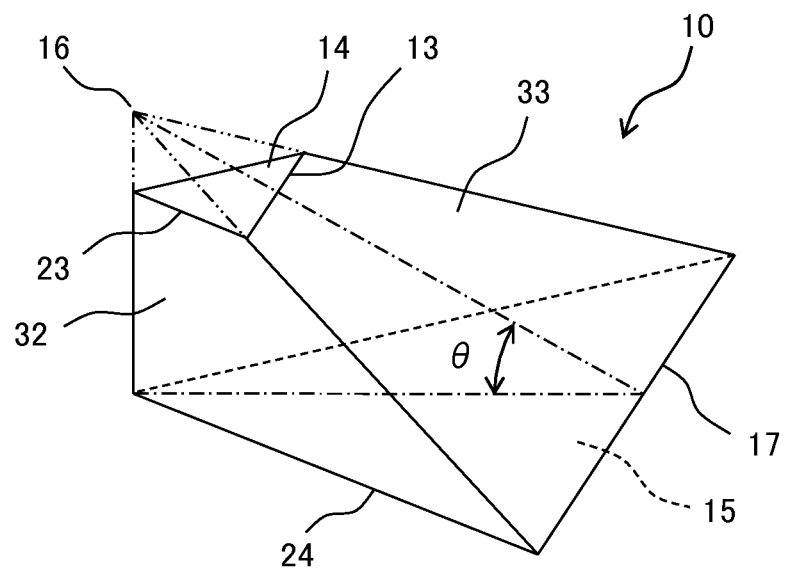
FIG. 5A is a perspective view of a vortex-generator-shaped fin according to the embodiment of the invention.
Figure 5B:
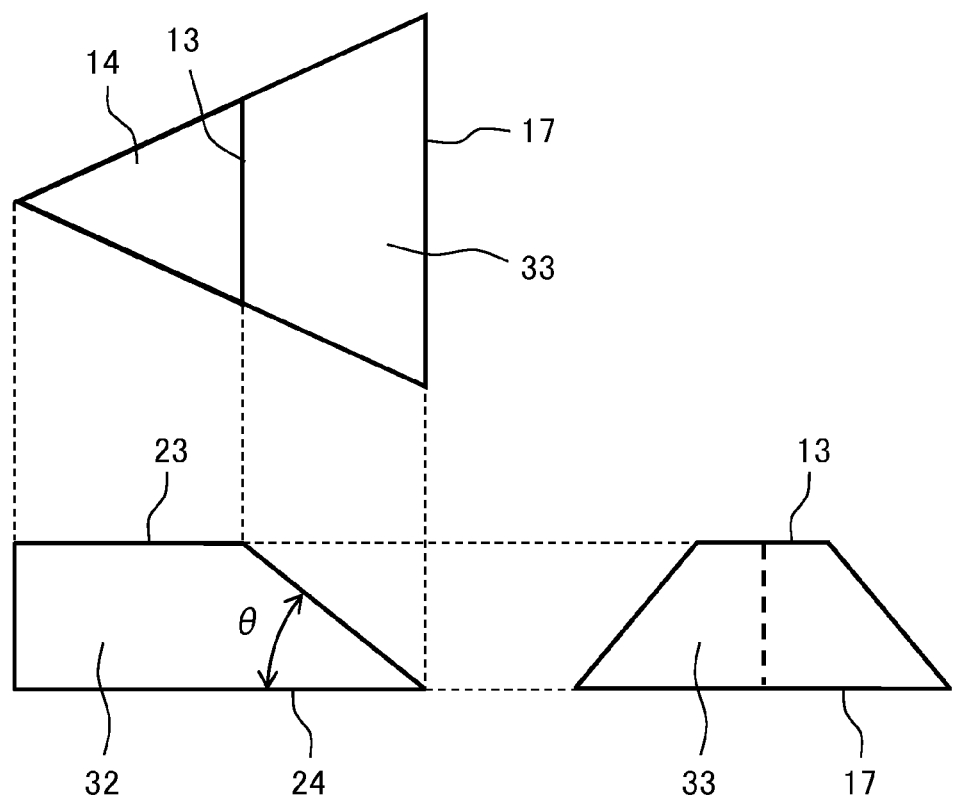
FIG. 5B is a three-plane view of the vortex-generator-shaped fin.

FIG. 5A is a perspective view of one of the vortex-generator-shaped fins 10 while FIG. 5B is a three-plane view of the vortex-generator-shaped fin 10.

Each part of the vortex-generator-shaped fin 10 will now be described.

The vortex-generator-shaped fin 10 is pyramidal-frustum-shaped and includes surfaces 14 and 15 that are in contact with the cooling target surfaces 6a and 6b, respectively. For the sake of convenience, these surfaces 14 and 15 are hereinafter referred to as the bottom surfaces 14 and 15. The bottom surfaces 14 and 15 differ in area, but both of them are substantially isosceles-triangle-shaped. The upper bottom surface 14 has a base 13 that is located across from the vertex angle between the two other sides 23 (that is, the base 13 is the side sandwiched between the two base angles). Likewise, the lower bottom surface 15 has a base 17 that is located across from the vertex angle between the two other sides 24 (that is, the base 17 is the side sandwiched between the two base angles). Each vertex of the bottom surfaces 14 and 15 faces the upstream side of the flow direction of cooling air. Also, the apex 16 of an imaginary triangular pyramid that can be formed by extending the lateral edges of the pyramidal frustum shape of the fin 10 (i.e., the apex 16 being an imaginary one located above the upper bottom surface 14) is located upstream of the centroid of the bottom surface 15 in terms of the air flow direction. The vortex-generator-shaped fin 10 also includes two lateral surfaces 32 that are in contact with the vertex angles of the bottom surfaces 14 and 15 and are substantially trapezoid-shaped. Among the four angles of each of the lateral surfaces 32, the two angles that are in contact with the vertex angles of the bottom surfaces 14 and 15 are substantially right angles. The vortex-generator-shaped fin 10 further includes an oblique surface 33 located between the two lateral surfaces 32. The oblique surface 33 extends from the base 13 of the upper bottom surface 14 straight down to the base 17 of the lower bottom surface 15 and extends downwardly in the flow direction of cooling air. The oblique surface 33 is substantially isosceles-trapezoid-shaped. A normal line 34 to the oblique surface 33 (see FIG. 3) intersects with one of the cooling target surfaces 6a and 6b (in the present embodiment, the normal line 34 intersects with the suction-side cooling target surface 6a, which is subject to higher thermal loads). Further, an attack angle θ is formed between the oblique surface 33 and the bottom surface 15 in the flow direction of cooling air. The attack angle θ is in the range from 30 to 60 degrees.

In the present embodiment, the presence of the vortex-generator-shaped fins 10 improves the cooling performance of the cooling target surface 6a, one of the surfaces in the trailing-edge cooling channel. As the temperature difference between cooling air and working gas (i.e., combustion gas) increases due to increases in the temperature of the working gas, the temperature difference between the pressure and suction sides of the trailing edge increases accordingly. As a result, the trailing edge may be subject to excessive thermal stresses. However, the present embodiment allows for reducing the temperature difference between the pressure and suction sides of the gas turbine blade, thereby lessening thermal stress. The following describes the principles behind it.

Figure 6:
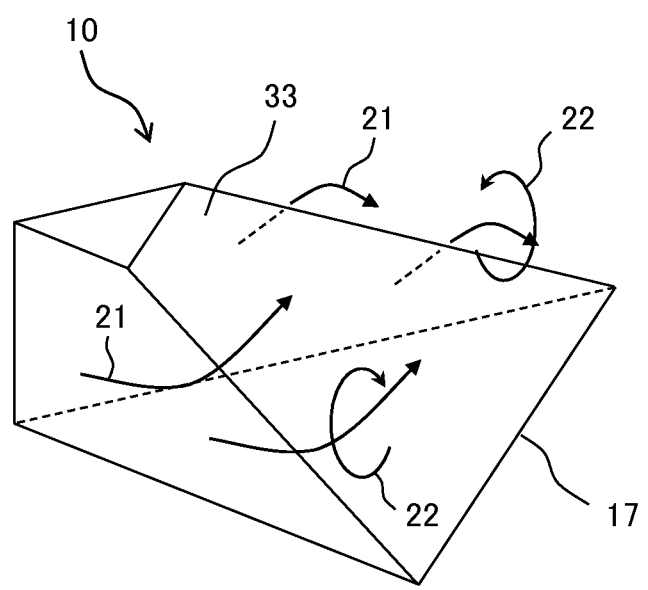
FIG. 6 is a model schematic illustrating the flow of cooling air around the vortex-generator-shaped fin.

FIG. 6 is a model schematic illustrating the flow of cooling air around one of the vortex-generator-shaped fins 10.

To increase the heat transfer coefficient of a cooling target surface, it is effective to impart velocity components perpendicular to the surface to the flow of cooling air. By doing so, the transfer of heat can be activated. As illustrated in FIG. 6, the vortex-generator-shaped fin 10 produces upward flows 21. The upward flows 21 have upward velocity components that flow toward the cooling target surface 6a along the oblique surface 33. The upward flows 21 cause the low-temperature air located near the center of the trailing-edge cooling channel to move toward the cooling target surface 6a, thereby increasing the cooling performance of the surface 6a. The vortex-generator-shaped fin 10 also produces secondary flows 22, which break a temperature boundary layer near the cooling target surface 6a. Thus, the transfer of heat across the cooling target surface 6a can be activated further, and the cooling target surface 6a is expected to have better cooling performance across its wider area.

Accordingly, even if the trailing-edge cooling channel is narrow, the temperature difference between the cooling target surfaces 6a and 6b can be reduced, and thermal stress can be lessened as well. This in turn improves the reliability of the gas turbine blade.

What is claimed is:

1. A gas turbine blade comprising:
   an internal cooling channel formed by two mutually-facing cooling target surfaces, one of the cooling target surfaces being located on a suction side, the other being located on a pressure side; and
   a plurality of structural components disposed between the two cooling target surfaces such that the plurality of structural components connect the two cooling target surfaces, wherein
      each of the plurality of structural components is pyramidal-frustum-shaped and includes: i) two bottom surfaces contacted with the two cooling target surfaces, the two bottom surfaces having triangular shapes that differ in area, each triangular shape having three vertices with one vertex of each triangular shape facing the upstream side of a flow direction of a cooling medium and the other two vertices facing a downstream side of the flow direction of the cooling medium, and ii) an oblique surface that is oblique relative to the flow direction of the cooling medium is located on the downstream side of the flow direction of the cooling medium,
      the two cooling target surfaces are subject to different thermal loads, and
      a normal line to the oblique surface intersects with one of the two cooling target surfaces that is subject to higher thermal loads than the other of the two cooling target surfaces.

2. The gas turbine blade according to claim 1, wherein the oblique surface is isosceles-trapezoid-shaped and an angle formed between the oblique surface and one of the two bottom surfaces in the flow direction of the cooling medium is in the range from 30 to 60 degrees.

* * * * *